(12) United States Patent
Seol

(10) Patent No.: US 11,458,937 B2
(45) Date of Patent: Oct. 4, 2022

(54) BRAKING APPARATUS FOR VEHICLE AND METHOD OF CONTROLLING THE SAME

(71) Applicant: HYUNDAI MOBIS CO., LTD., Seoul (KR)

(72) Inventor: Yong Cheol Seol, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 122 days.

(21) Appl. No.: 17/016,362

(22) Filed: Sep. 9, 2020

(65) Prior Publication Data

US 2021/0070262 A1 Mar. 11, 2021

(30) Foreign Application Priority Data

Sep. 11, 2019 (KR) .......................... 10-2019-0112601

(51) Int. Cl.
| | |
|---|---|
| *B60T 8/17* | (2006.01) |
| *B60T 17/22* | (2006.01) |
| *B60T 7/04* | (2006.01) |
| *B60T 13/14* | (2006.01) |
| *B60T 8/94* | (2006.01) |

(Continued)

(52) U.S. Cl.
CPC ................ *B60T 8/17* (2013.01); *B60T 7/042* (2013.01); *B60T 8/94* (2013.01); *B60T 13/145* (2013.01); *B60T 13/662* (2013.01); *B60T 17/221* (2013.01); *B60T 8/4086* (2013.01); *B60T 2270/402* (2013.01); *B60T 2270/404* (2013.01); *B60T 2270/82* (2013.01)

(58) Field of Classification Search
CPC .......... B60T 8/17; B60T 17/221; B60T 7/042; B60T 13/145; B60T 8/4086; B60T 8/94; B60T 2270/82; B60T 2270/402; B60T 2270/404; B60T 13/662
See application file for complete search history.

(56) References Cited

U.S. PATENT DOCUMENTS

| 4,805,966 A | * | 2/1989 | Reinartz | ............... B60T 13/146 60/563 |
| 5,433,514 A | * | 7/1995 | Tsukamoto | ........... B60T 8/4863 303/113.2 |

(Continued)

FOREIGN PATENT DOCUMENTS

| DE | 102005063691 B3 * | 3/2021 |
| KR | 10-2015-0022439 | 3/2015 |

*Primary Examiner* — Pamela Rodriguez
(74) *Attorney, Agent, or Firm* — H.C. Park & Associates, PLC

(57) ABSTRACT

A braking apparatus for a vehicle and a method for controlling the same. The braking apparatus includes a master cylinder configured to form braking pressure based on an input to a brake pedal and transmit the braking pressure to a wheel brake side, a motor configured to control the pressure transmitted to the wheel brake side by moving a piston included in the master cylinder, and a controller configured to control the motor. The controller determines whether the piston reaches an end point of travel, based on a rate of change in a position of the piston and a current of the motor, and sets a displacement of the piston as a maximum displacement when it is determined that the piston has reached the end point and position initialization for the piston has been completed.

13 Claims, 7 Drawing Sheets

(51) Int. Cl.
　　　*B60T 13/66*　　　(2006.01)
　　　*B60T 8/40*　　　(2006.01)

(56) References Cited

U.S. PATENT DOCUMENTS

| | | | |
|---|---|---|---|
| 2002/0084693 A1* | 7/2002 | Isono | B60T 8/4018 |
| | | | 303/113.1 |
| 2012/0102941 A1* | 5/2012 | Yamada | B60T 8/4845 |
| | | | 60/545 |
| 2016/0214589 A1* | 7/2016 | Seol | B60T 8/4081 |
| 2020/0001842 A1* | 1/2020 | Seol | B60T 8/4081 |

* cited by examiner

BRAKING APPARATUS FOR VEHICLE AND METHOD OF CONTROLLING THE SAME

CROSS-REFERENCE TO RELATED APPLICATION

This application claims priority from and the benefit of Korean Patent Application No. 10-2019-0112601, filed on Sep. 11, 2019, which is hereby incorporated by reference for all purposes as if set forth herein.

BACKGROUND

Field

Exemplary embodiments relate to a braking apparatus for a vehicle and a method of controlling the same, and more particularly, to a braking apparatus for a vehicle using an electric method and a method of controlling the same.

Discussion of the Background

In general, a conventional braking apparatus for a vehicle increases a pedal operating force of a driver through a booster using a hydraulic system, and provides the pedal operating force to a master cylinder, and generate a braking force by transmitting, to a wheel cylinder of each wheel, braking pressure formed by the master cylinder. Furthermore, the braking apparatus separately includes an anti-lock brake system (AVS) or an electronic stability control (ESC) device, and can perform independent braking for each wheel based on a situation of the vehicle by controlling the braking pressure provided to the wheel cylinder.

Recently, a system that requires high control precision and stability, such as a regenerative braking system, is increasingly adopted as a braking apparatus for a vehicle. Accordingly, research on a system capable of active control regardless of a pedal operating force of a driver, a vacuum-free braking system through the deletion of a vacuum booster, etc. is increased. Examples of the braking apparatus for a vehicle that has been actively researched as described above includes an electro mechanical brake (EMB) or an electro wedge brake (EWB) that is an electric system, an electro hydraulic Brake (EHB) or an active hydraulic booster (AHB) that is a hydraulic brake-by-wire system, etc.

In general, the electric braking system is different from a vacuum booster in that it maintains most of the braking mechanism of the existing vacuum booster, but boosts braking oil pressure by the force of an electric booster (i.e., motor) using electric energy instead of boosting braking oil pressure through difference pressure between pneumatic pressure and vacuum pressure like the vacuum booster.

The Background Technology of the present disclosure is disclosed in Korean Patent Application Laid-Open No. 10-2015-0022439 (Mar. 4, 2015).

In an ESC-integrated regenerative braking system, a method of controlling pressure by axially moving a piston using a screw structure and a motor capable of precision control is chiefly used.

In such a system, it is important to check the position of the piston in order to control pressure. A position sensor for detecting an absolute position of the piston may be used, but a method of calculating a displacement of the piston using the RPM of the motor and the lead length of a lead screw may be used. In this case, it is necessary to check an initial position of the piston because only the displacement of the piston can be checked. To accomplish this, a method of initializing the position of the piston has been proposed.

According to the conventional technology, there is no problem if position initialization for the piston is always performed normally. However, if power of a system is blocked during pressure control due to an abnormal battery for a vehicle or if the power of the system is activated by a brake stepped on by a driver in the state in which the position of the piston has not been initialized and the system has been deactivated, pressure has to be formed by forward moving the piston in the state in which the position of the piston has not been checked, because the braking force has to be generated based on a braking intention of the driver.

In such a case, the piston does not reach a direction change displacement although it reaches the end point (of travel) because the piston has started to move at a middle position, and not a starting position. Accordingly, there are problems in that an actuator is actually normal, but is determined to fail and a braking force necessary for a driver is not provided because the piston does not perform a backward pressure control process and only a current is increased.

The above information disclosed in this Background section is only for enhancement of understanding of the background of the invention and, therefore, it may contain information that does not constitute prior art.

SUMMARY

Exemplary embodiments of the present invention are directed to solving the problems of the conventional braking apparatus for a vehicle and a method of controlling the same, and to the provision of a braking apparatus for a vehicle, which can perform smooth control and prevent the occurrence of a misjudgment although it is necessary to form pressure by a brake stepped on by a driver in a situation in which the position of a piston has not been determined normally, and a method of controlling the same.

Additional features of the invention will be set forth in the description which follows, and in part will be apparent from the description, or may be learned by practice of the invention.

An exemplary embodiment of the present invention provides a braking apparatus for a vehicle including a master cylinder configured to form braking pressure based on an input to a brake pedal and transmit the braking pressure to a wheel brake side, a motor configured to control the pressure transmitted to the wheel brake side by moving a piston included in the master cylinder, and a controller configured to control the motor. The controller determines whether the piston reaches an end point (of travel) based on a rate of change in a position of the piston and a current of the motor, and sets a displacement of the piston as a maximum displacement when it is determined that the piston has reached the end point and position initialization for the piston has not been completed.

The controller may output a warning signal when it is determined that the piston has reached the end point and the position initialization for the piston has been completed.

The controller may determine that the piston has reached the end point, when the rate of change in the position of the piston is less than or equal to a threshold rate of change and the current of the motor is equal to or greater than a reference current by a threshold value.

The controller may set the position initialization for the piston as having been completed when setting the displacement of the piston as the maximum displacement.

The controller may perform a backward pressure control process after setting the displacement of the piston as the maximum displacement.

The controller may determine whether the piston reaches the end point, in a forward pressure control process.

Another exemplary embodiment of the present invention provides a method of controlling a braking apparatus for a vehicle, which includes a master cylinder configured to form braking pressure based on an input to a brake pedal and transmit the braking pressure to a wheel brake side and a motor configured to control the pressure transmitted to the wheel brake side by moving a piston included in the master cylinder, includes controlling, by a controller, the motor based on required pressure, determining, by the controller, whether the piston reaches an end point, based on a rate of change in a position of the piston and a current of the motor, and setting, by the controller, a displacement of the piston as a maximum displacement when it is determined that the piston has reached the end point and position initialization for the piston has not been completed.

The method may further include outputting, by the controller, a warning signal when it is determined that the piston has reached the end point and the position initialization for the piston has been completed.

In the determining of whether the piston reaches the end point, the controller may determine that the piston has reached the end point, when the rate of change in the position of the piston is a threshold rate of change or less and the current of the motor is higher than a reference current by a threshold value.

In the setting of the displacement of the piston as the maximum displacement, the controller may set the position initialization for the piston as having been completed.

The method may further include performing, by the controller, a backward pressure control process after the setting of the displacement of the piston as the maximum displacement.

In the controlling of the motor based on the required pressure, the controller may perform a forward pressure control process.

The method may further include calculating, by the controller, the required pressure for an input to the brake pedal when the input to the brake pedal is performed before the controlling of the motor based on the required pressure.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
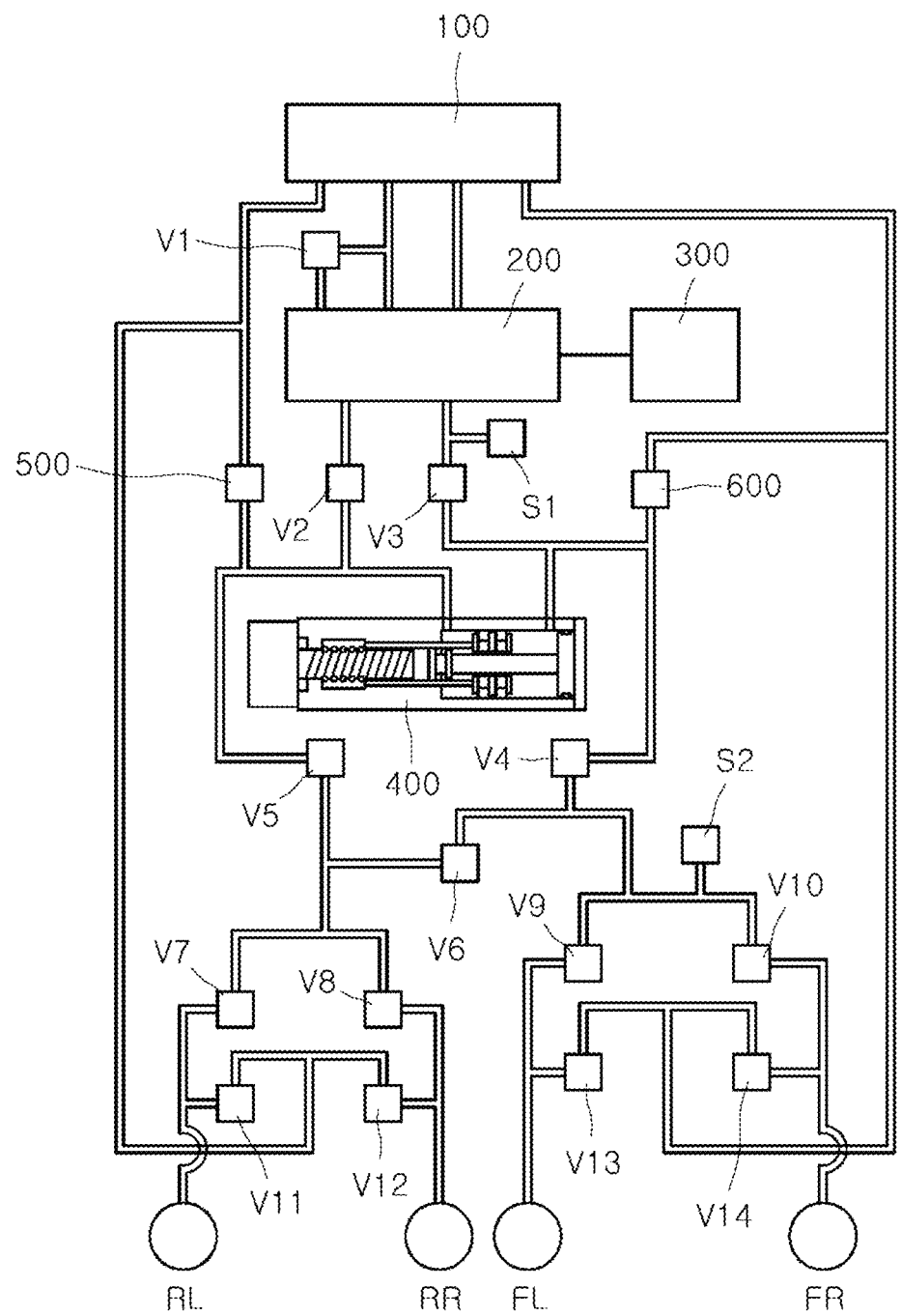
FIG. 1 is a block diagram illustrating a configuration of a braking apparatus for a vehicle according to an embodiment of the present disclosure.

DETAILED DESCRIPTION OF THE
ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, a braking apparatus for a vehicle and a method of controlling the same will be described with reference to the accompanying drawings through various exemplary embodiments. The thickness of lines or the size of elements shown in the drawings in a process of describing this specification may have been exaggerated for the clarity of a description and for convenience' sake. Furthermore, terms to be described below are defined by taking into consideration their functions in the present disclosure, and may be different depending on a user or operator's intention or practice. Accordingly, such terms should be interpreted based on the overall contents of this specification.

As known in the art to which the present disclosure pertains, some illustrative embodiments may be illustrated in the accompanying drawings from a point of view of a function block, unit and/or module. Those skilled in the art may understand that such blocks, units and/or modules may be physically implemented by electronic (or optical) circuits, such as logic circuits, separated parts, processors, hard-wired circuits, memory devices, or line connections. If the blocks, the units and/or the modules are implemented by a processor or other similar hardware, they may be programmed and controlled using software (e.g., code) in order to perform various functions discussed in this specification. Furthermore, each block, each unit and/or each module may be implemented by dedicated hardware or as a combination of dedicated hardware for performing some functions and a processor (e.g., one or more programmed processors and a related circuit thereof) for performing another function. Furthermore, in some illustrative embodiments, each block, each unit and/or each module may be separated into two or more blocks, units and/or modules that are physically interactive and separated, without departing from the scope of the concept of the present disclosure. Furthermore, in some illustrative embodiments, a block, a unit and/or a module may be physically combined with a more complex block, unit and/or module without departing from the scope of the concept of the present disclosure.

Figure 2:
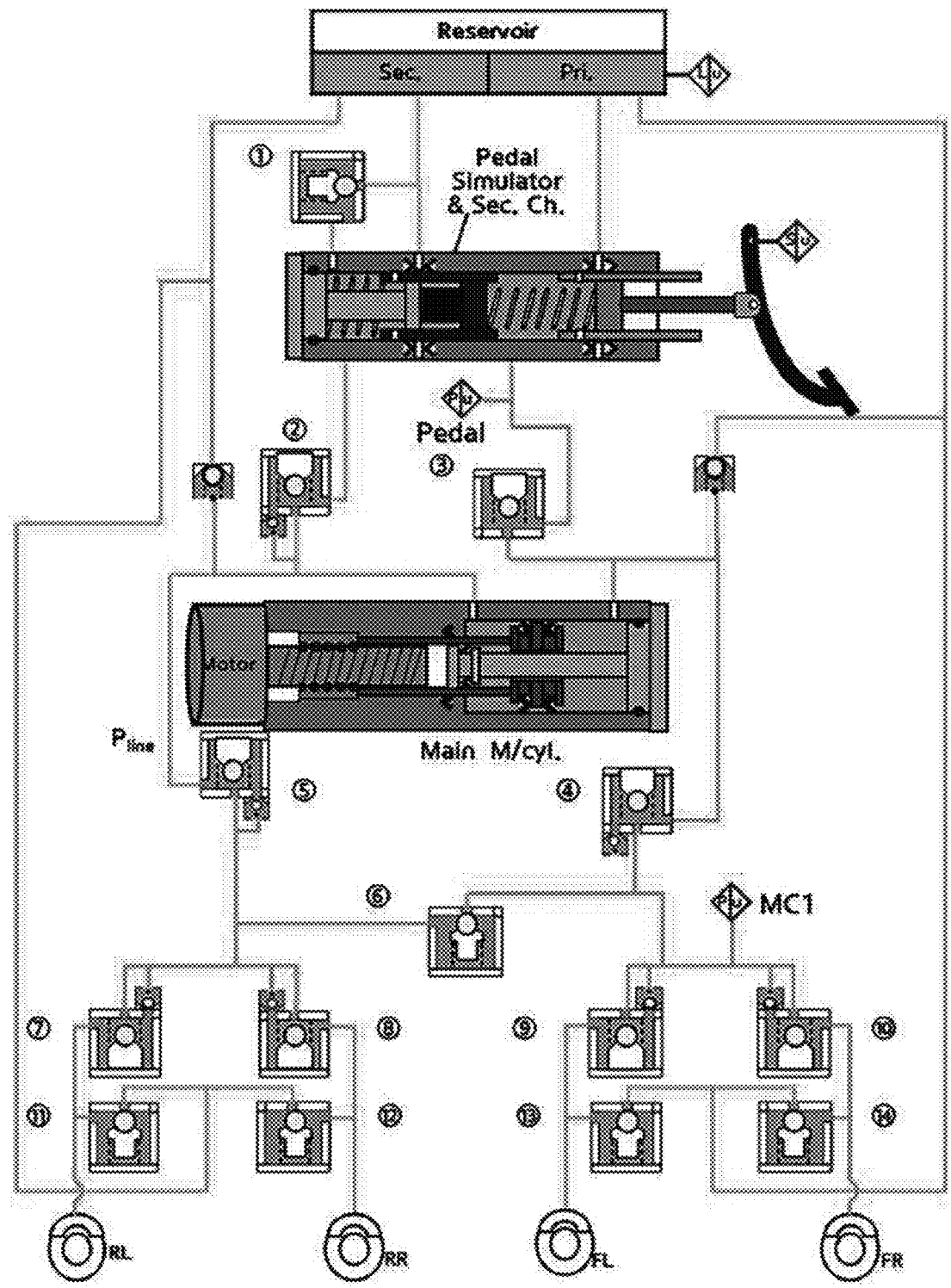
FIG. 2 is an exemplary diagram illustrating a detailed configuration of the braking apparatus for a vehicle illustrated in FIG. 1.
Figure 3:
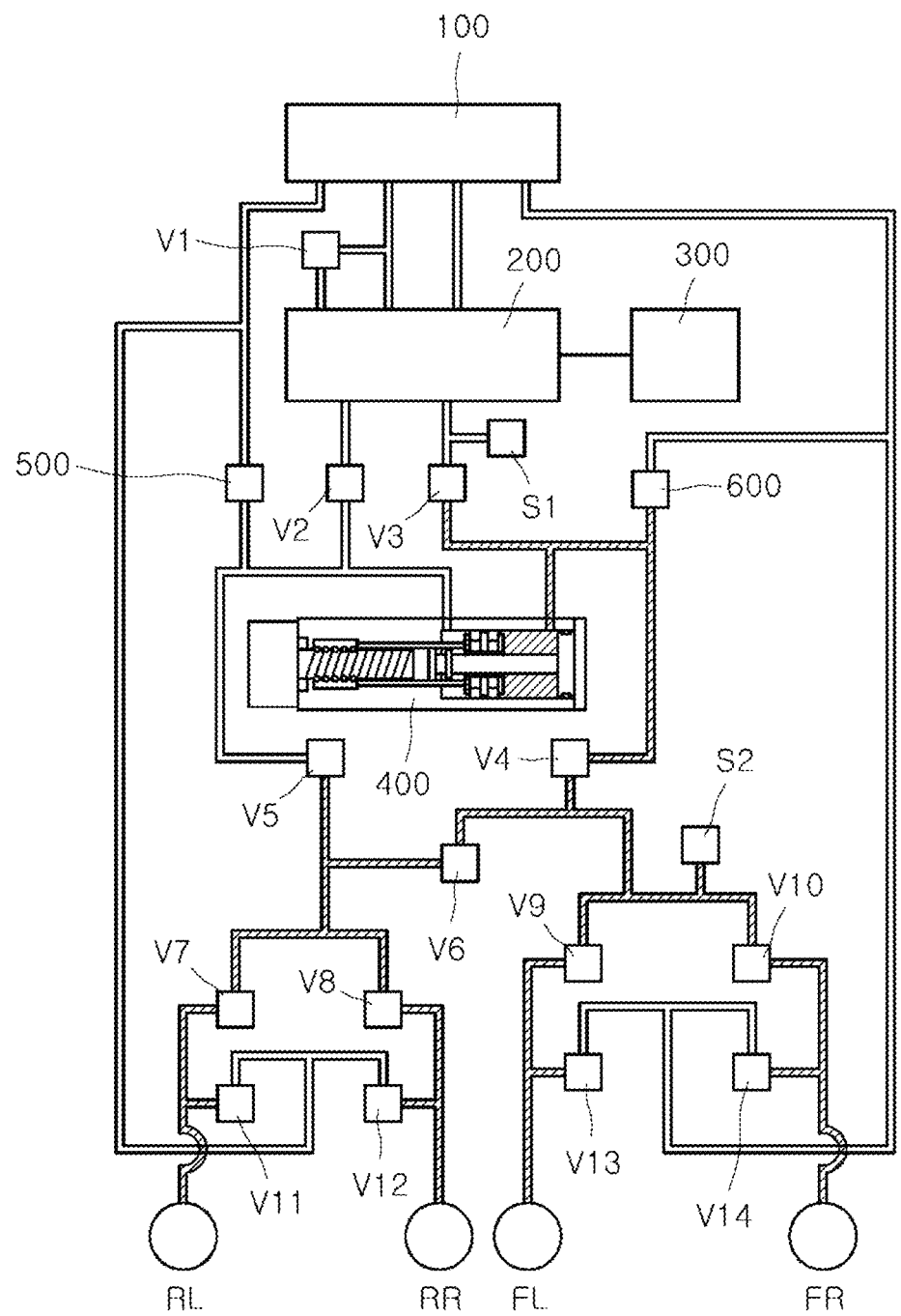
FIG. 3 is an exemplary diagram for describing a forward pressure control process in the braking apparatus for a vehicle according to an embodiment of the present disclosure.
Figure 4:
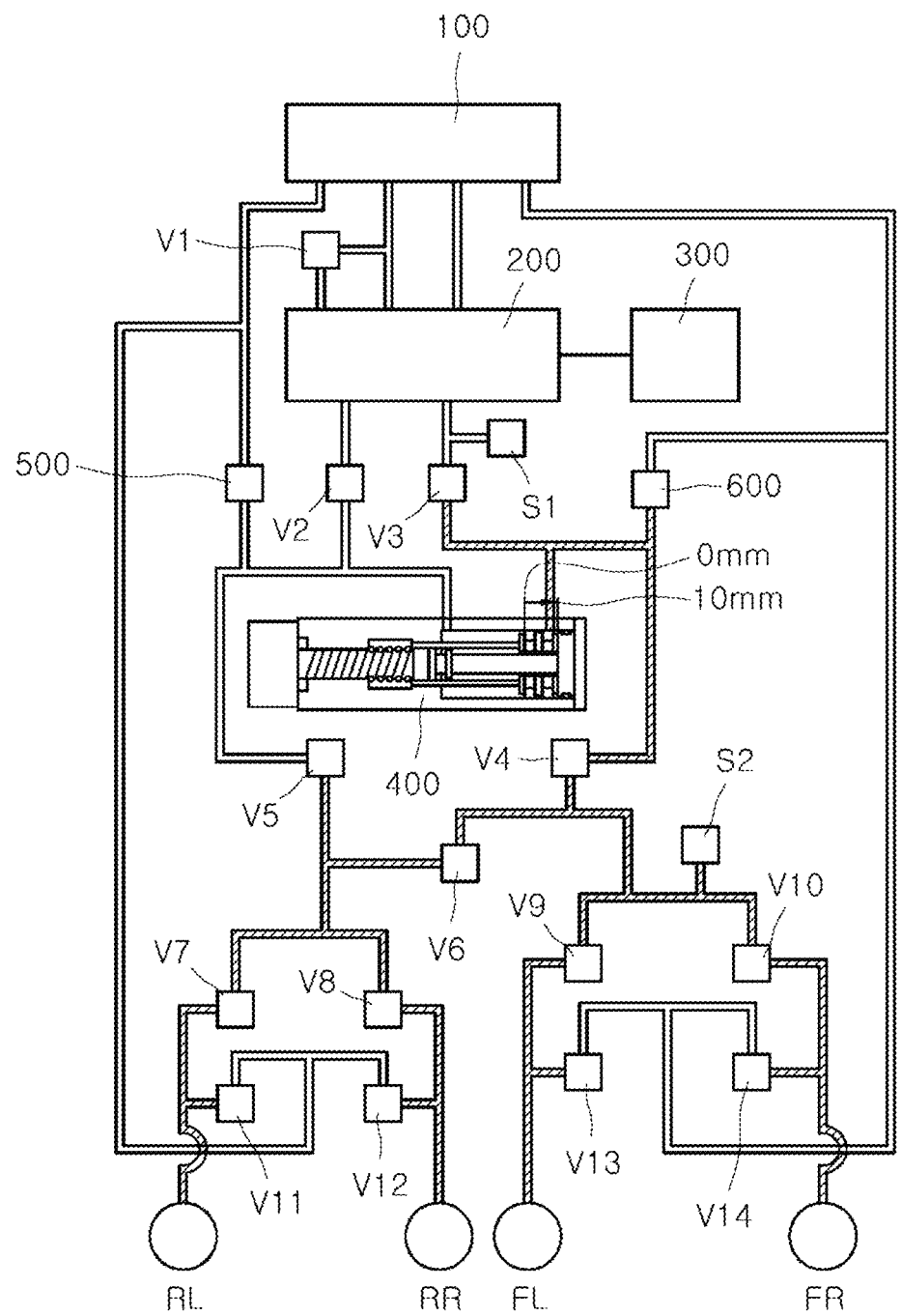
FIG. 4 is an exemplary diagram for describing a backward pressure control process in the braking apparatus for a vehicle according to an embodiment of the present disclosure.
Figure 5:
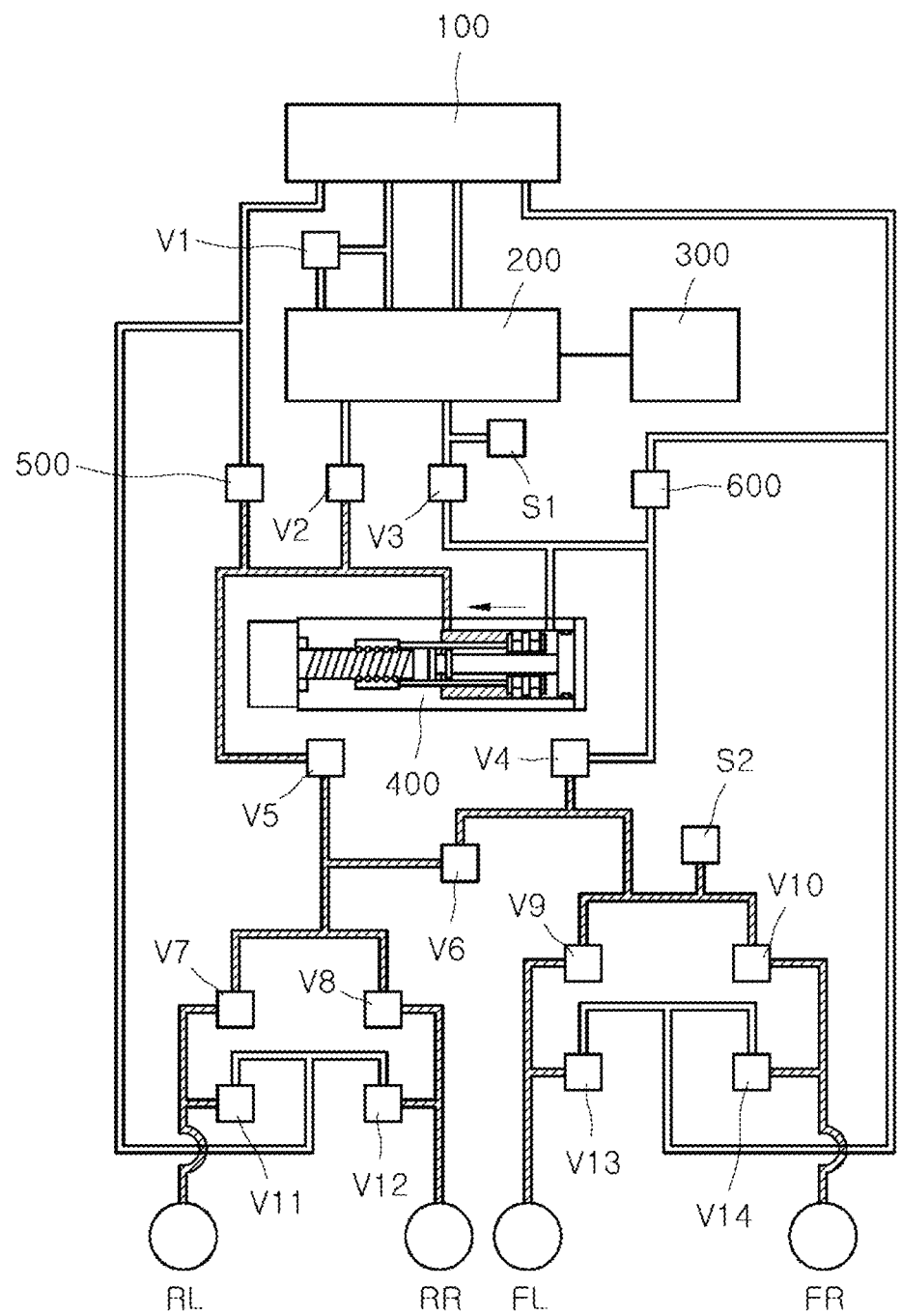
FIG. 5 is an exemplary diagram for describing a case where a piston starts to move at a middle position in the braking apparatus for a vehicle according to an embodiment of the present disclosure.
Figure 6:
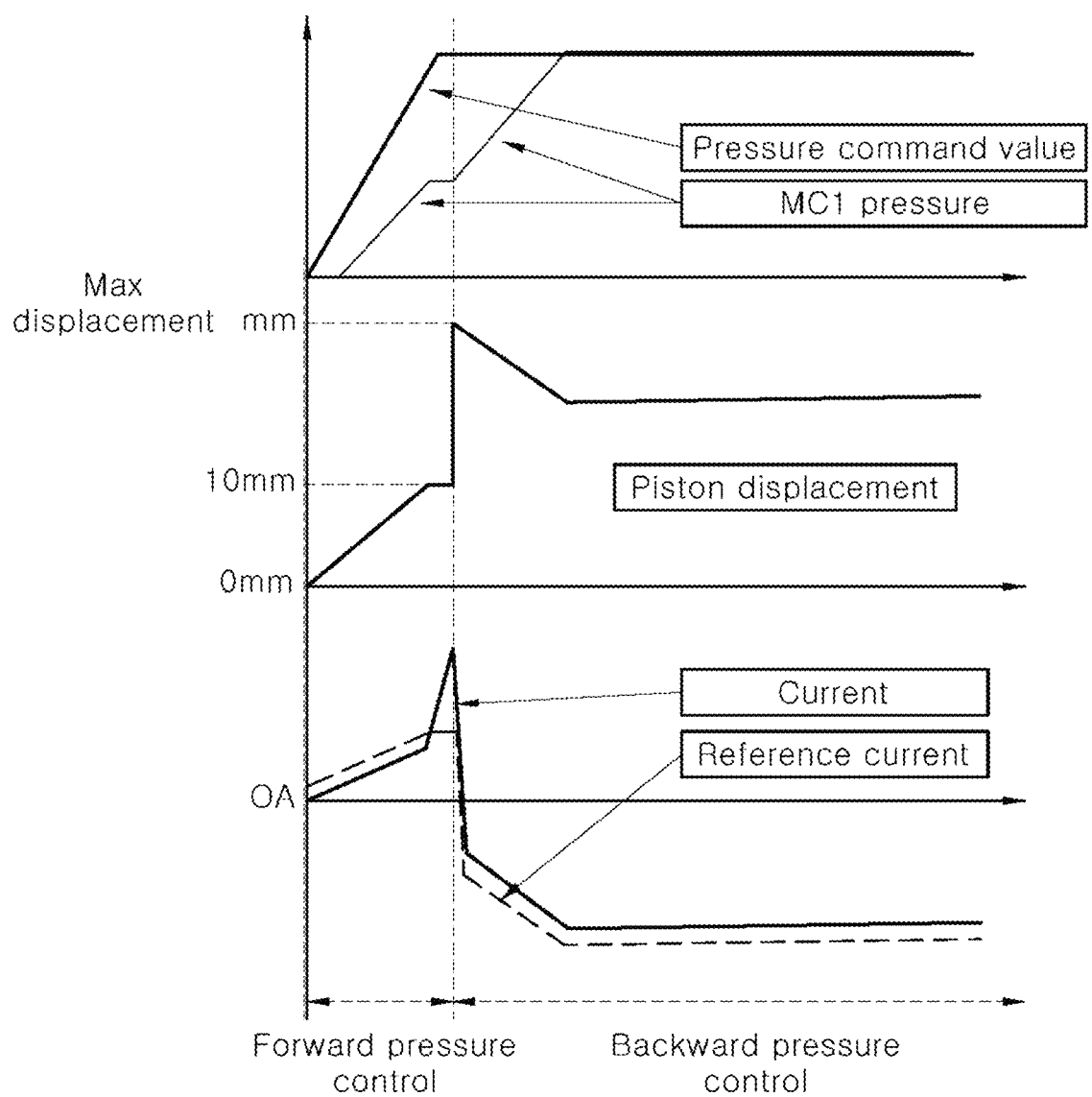
FIG. 6 is an exemplary diagram for describing an operating method of the braking apparatus for a vehicle according to an embodiment of the present disclosure.

FIG. 1 is a block diagram illustrating a configuration of a braking apparatus for a vehicle according to an embodiment of the present disclosure. FIG. 2 is an exemplary diagram illustrating a detailed configuration of the braking apparatus for a vehicle illustrated in FIG. 1. FIG. 3 is an exemplary diagram for describing a forward pressure control process in the braking apparatus for a vehicle according to an embodiment of the present disclosure. FIG. 4 is an exemplary diagram for describing a backward pressure control process in the braking apparatus for a vehicle according to an embodiment of the present disclosure. FIG. 5 is an exemplary diagram for describing a case where a piston starts to move at a middle position in the braking apparatus for a vehicle according to an embodiment of the present disclosure. FIG. 6 is an exemplary diagram for describing an operating method of the braking apparatus for a vehicle according to an embodiment of the present disclosure. The braking apparatus for a vehicle according to the present embodiment is described as follows with reference to FIGS. 1 to 6.

As illustrated in FIGS. 1 and 2, the braking apparatus for a vehicle according to an embodiment of the present disclosure may include multiple valves (or actuators), a reservoir 100, a pedal simulator 200, a brake pedal 300, a braking pressure forming unit 400, and a pressure (i.e., oil pressure) line (or passage) connecting the aforementioned elements.

The multiple valves control a path of pressure, and may be configured with six permanent operation valves V1 to V6, two check valves 500 and 600, and eight valves V7 to V14 for controlling functions (e.g., an ABS, vehicle dynamic control (VDC), and a traction control system (TCS)) by controlling braking pressure transmitted to each wheel, for example.

In the present embodiment, a pressure line has been illustrated as being positioned in an H-split form for rear wheel regenerative braking so that pressure is formed from a front wheel, but may be configured in an X-split form.

The reservoir 100 stores oil, and supplies the oil to a master cylinder of the braking pressure forming unit 400.

The pedal simulator 200 provides a pedal effort of the brake pedal 300 felt by a driver.

The braking pressure forming unit 400 includes the master cylinder, a motor and a controller, and forms braking pressure.

The master cylinder may form braking pressure based on an input to the brake pedal 300 and transmit the braking pressure to a wheel brake side.

The motor may control pressure transmitted to the wheel brake side by moving the piston included in the master cylinder. The controller may control the motor.

As may be seen from FIG. 2, a ball screw and a nut coupled to the motor converts a rotary motion of the motor into a rectilineal motion of the piston, thus enabling the piston to move.

The controller may calculate a displacement of the piston based on a value obtained by multiplying the RPM of the motor and the lead length of a lead screw.

Furthermore, pressure sensors S1 and S2 are provided on the brake pedal 300 and front wheel sides, respectively, and may measure pressure. The measured pressure may be transmitted to the controller.

The present embodiment illustrates that the system for providing oil pressure as braking pressure includes the pedal simulator, etc. The system may also be applied to a brake system for a vehicle which some elements are excluded from or added to, depending on an intention of the present disclosure.

In the present embodiment, in general, position initialization for the piston is performed in a standby state after the system becomes on, and means that the piston is moved to a starting position.

Specifically, for example, when the braking apparatus is activated by the opening of a door or ignition-on in a vehicle, a braking intention of a driver is not present. Therefore, the braking apparatus performs the position initialization for the piston, and locates the piston at a standby (i.e., starting point) position so that an initial position of the piston can be checked.

First, in order to determine whether the piston is stuck, the motor is forward rotated to move the piston forward. When the piston reaches up to a given displacement, the motor is backward rotated to move the piston backward. If a movement of the piston is not moved for a given time although a torque for rotating the motor backward continues to be applied, a corresponding point is determined as a mechanical starting point. In order to protect the system when the motor is controlled, the piston is made standby at a position ahead of the mechanical starting position by a given displacement. Through such a process, the position initialization for the piston may be performed. For example, the position initialization may be performed in the same manner as in the conventional patent described in the Background Technology. Furthermore, in addition to such a method, any method of moving the position of the piston to a preset starting position may be adopted.

Whether position initialization for the piston is completed may be recorded using a method of setting a flag, indicating whether position initialization is completed, to 1 (completed state) or 0 (uncompleted state). The value of the flag may be stored in the controller.

Furthermore, after the position initialization for the piston is completed, when the start and completion of a movement of the piston is performed or the braking apparatus is deactivated, a value of the flag may be changed to 0.

After the position initialization for the piston is terminated, in order to reduce valve noise, a duty may be applied to the valves V1, V3, V5, and V6, operating to form pressure and a pedal feel when the brake operates, so that the valves are made standby. The valves may be made standby in such a state until an input to the pedal brake 300 is determined by a pedal stroke sensor.

When a required braking force is generated by the pedal stroke sensor, a forward pressure control process for forming pressure by moving the piston forward based on the required braking pressure is performed. When a backward pressure control condition (e.g., pressure or a displacement) is satisfied, a backward pressure control process for forming pressure by moving the piston backward again is performed after a maximum displacement is reached.

FIG. 3 illustrates the path of oil pressure according to the forward pressure control process. FIG. 4 illustrates the path of oil pressure according to the backward pressure control process. As may be seen from the configuration of the braking pressure forming unit 400 of FIGS. 3 and 4, a rotary motion of the motor is converted into a rectilineal motion of the piston, thus moving the piston. In the forward pressure control process, as the piston is forward moved, braking pressure is formed. Furthermore, in the backward pressure control process, as the piston is backward moved, braking pressure is formed. The forward pressure control process and the backward pressure control process according to the present embodiment are widely used in the technical field of the present disclosure, and thus a further description thereof is omitted.

If the braking apparatus is activated by a pedal stroke, there may be a case where the piston starts to move at a middle position, not the starting position. In such a case, a control method of the controller according to the present embodiment is described as follows with reference to FIGS. 5 and 6.

When a driver steps on the brake pedal 300, a pedal stroke sensor detects a braking force intended by the driver. A detection value of the pedal stroke sensor may be transmitted to the controller. The controller may calculate required pressure for a braking force to be applied to each wheel, based on the detection value. Alternatively, another control device other than the controller may receive the detection value of the pedal stroke sensor, may calculate required pressure, and may transmit the calculated required pressure to the controller.

The controller forms pressure by moving the piston forward through control of the motor based on the required pressure. In such a forward pressure control process, the controller may determine whether the piston reaches the end point (of travel) based on a rate of change in the position of the piston and a current of the motor.

Specifically, for example, when a rate of change in the position of the piston is a threshold rate of change or less and a current of the motor is higher than a reference current by a threshold value, the controller may determine that the piston has reached the end point.

That is, since the piston no longer moves forward when the piston reaches the end point, the rate of change in the position of the piston becomes the threshold rate of change or less. As may be seen from FIG. 6, in this case, when a required pressure command value is greater than current pressure, a current of the motor becomes higher than a reference current because the controller continuously operates to move the piston forward. Accordingly, when the current of the motor is higher than the reference current by a threshold value, the controller may determine that the piston has reached the end point.

In this case, the reference current, the threshold rate of change, and the threshold value may be designed as various values depending on a user's intention, the specifications of the motor or the piston, etc. The reference current indicates a predicted current value corresponding to current pressure. The threshold rate of change may be set as a value close to 0, for example.

In this case, the state in which position initialization for the piston has not been completed corresponds to a case where a displacement of the piston has not reached a direction change reference displacement (i.e., the distance between the starting point and the end point) because the piston has started to move at a middle position, but the piston has reached the end point, as illustrated in FIG. 5.

Accordingly, in such a case, the controller can accurately set a current displacement of the piston by setting a displacement of the piston as a maximum displacement.

When the displacement of the piston is set as the maximum displacement as described above, the displacement of the piston reaches the direction change reference displacement. Accordingly, the controller determines that the backward pressure control condition has been satisfied, and performs the backward pressure control process.

Furthermore, when setting the displacement of the piston as the maximum displacement, the controller may set position initialization for the piston as having been completed because the controller has accurately checked the position of the piston.

When it is determined that the piston has reached the end point and the position initialization for the piston has been completed, the controller may output a warning signal. That is, the state in which the position initialization for the piston has been completed is not a case where a rate of change in the position becomes 0 and a current is increased because the piston has reached the end point, but a case where an abnormal output has been generated due to a stuck piston or an abnormal motor. Accordingly, the controller may notify that an abnormality has occurred in the braking apparatus, by outputting a warning signal. In this case, the controller may be configured to output the warning signal to a cluster or another control device of a vehicle, and may be configured to control the cluster of the vehicle to turn on a warning lamp in response to the warning signal.

In contrast, if a rate of change in the position of the piston is a threshold rate of change or less or a current of the motor is not greatly increased, this corresponds to a case where pressurization is no longer required because pressure control has been performed normally or a case where the controller enters the backward pressure control process. Accordingly, the controller may enter the backward pressure control process by checking whether the backward pressure control condition is satisfied.

Figure 7:
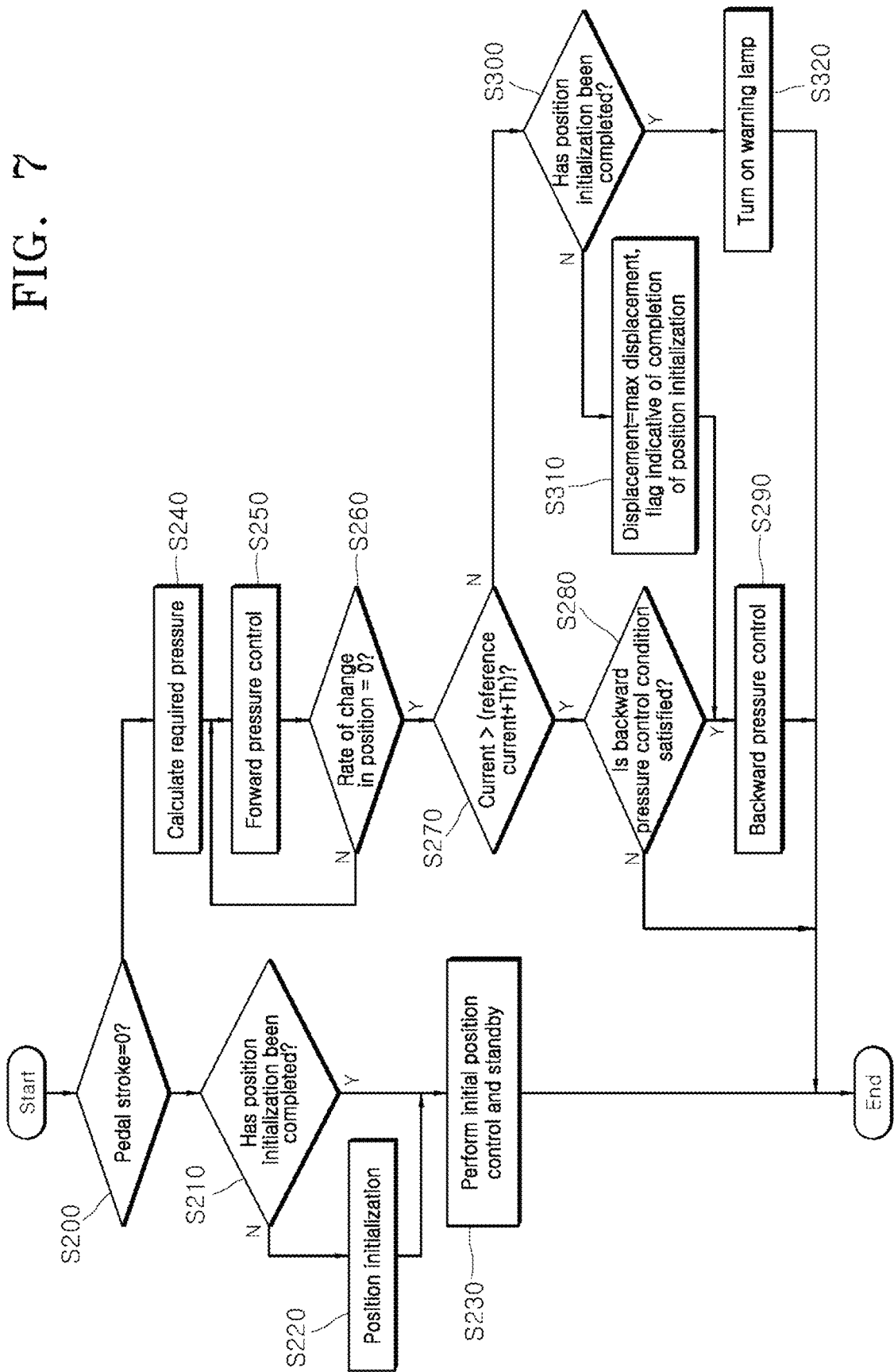
FIG. 7 is a flowchart for describing a method of controlling the braking apparatus for a vehicle according to an embodiment of the present disclosure.

FIG. 7 is a flowchart for describing a method of controlling the braking apparatus for a vehicle according to an embodiment of the present disclosure. The method of controlling the braking apparatus for a vehicle according to the present embodiment is described as follows with reference to FIG. 7.

As illustrated in FIG. 7, when the braking apparatus is activated, the controller first checks whether a brake pedal stroke is 0 (S200).

When the brake pedal stroke is 0, the controller checks whether position initialization for the piston is completed (S210). For example, when the braking apparatus is activated due to the opening of a door or ignition-on in a vehicle, the controller performs the position initialization for the piston so that an initial position of the piston can be checked, because a braking intention of a driver is not present.

If the position initialization for the piston has not been completed, the controller performs the position initialization for the piston (S220) and performs initial position control and standby (S230). In this case, the initial position control and the standby means that the piston is made standby at a position ahead of a mechanical starting position by a given displacement in order to protect the system upon control of the motor.

In contrast, if the position initialization for the piston has been completed, the controller directly proceeds to step S230.

When the brake pedal stroke is not 0, the controller calculates required pressure in response to the brake pedal stroke (S240). When a driver steps on the brake pedal 300, the pedal stroke sensor detects a braking force intended by the driver. A detection value of the pedal stroke sensor may be transmitted to the controller. The controller may calculate required pressure for a braking force to be applied to each wheel, based on the detection value.

Next, the controller performs the forward pressure control process so that the calculated required pressure is formed (S250). The controller forms the calculated required pressure by moving the piston forward through control of the motor based on the required pressure.

Thereafter, the controller checks whether a rate of change in the position of the piston is 0 (S260), and compares a current of the motor with a reference current (S270). That is, the controller may determine whether the piston reaches the end point, based on the rate of change in the position of the piston and the current of the motor.

If, as a result of the comparison (S270), the current of the motor is not higher than the reference current by a threshold value (Y in S270), the controller determines whether the backward pressure control condition is satisfied (S280), and performs the backward pressure control process when the backward pressure control condition is satisfied (S290). That is, a case where the current of the motor is not greatly increased corresponds to a case where pressurization is no longer required because pressure control has been performed normally or a case where the controller enters the backward pressure control process. Accordingly, the controller may enter the backward pressure control process by checking whether the backward pressure control condition is satisfied.

In contrast, if, as a result of the comparison (S270), the current of the motor is equal to or higher than the reference current by the threshold value (N in S270), the controller checks whether position initialization for the piston is completed (S300). That is, since the piston no longer moves forward when the piston reaches the end point, a rate of change in the position of the piston becomes a threshold rate of change or less. In this case, when a required pressure command value is greater than current pressure, the current of the motor becomes higher than the reference current because the controller continues to operate to move the piston forward. Accordingly, when the current of the motor is higher than the reference current by the threshold value, the controller may determine that the piston has reached the end point.

If the position initialization for the piston has not been completed, the controller sets a displacement of the piston as a maximum displacement and sets the position initialization as having been completed (S310). In this case, the state in which the position initialization for the piston has not been completed corresponds to a case where as described above, the displacement of the piston has not reached a direction change reference displacement (i.e., the distance between the starting point and the end point) because the piston has started to move at a middle position, but the piston has reached the end point. Accordingly, in such a case, the controller can accurately set a current displacement of the piston by setting a displacement of the piston as a maximum displacement.

Thereafter, the controller proceeds to step S290 and performs the backward pressure control process. That is, when the displacement of the piston is set as the maximum displacement, it reaches the direction change reference displacement. Accordingly, the controller determines that the backward pressure control condition has been satisfied, and performs the backward pressure control process.

In contrast, if the position initialization for the piston has been completed, the controller controls a warning lamp to be turned on by outputting a warning signal (S320). That is, the state in which the position initialization for the piston has been completed is not a case where a rate of change in the position becomes 0 and a current is increased because the piston has reached the end point, but a case where an abnormal output has been generated due to a stuck piston or an abnormal motor. Accordingly, the controller may notify that an abnormality has occurred in the braking apparatus, by outputting a warning signal. In this case, the controller may be configured to output the warning signal to the cluster or another control device of a vehicle, and may be configured to control the cluster of the vehicle to turn on a warning lamp in response to the warning signal.

As described above, the braking apparatus for a vehicle and the method of controlling the same according to embodiments of the present disclosure determine whether the piston reaches the end point based on a rate of change in the position of the piston and a current of the motor, and set a displacement of the piston as a maximum displacement or output a warning signal by further taking into consideration whether position initialization for the piston is completed, in a process of forming pressure based on an input to the brake pedal. Accordingly, the apparatus and method can provide a braking force based on a braking intention of a driver can be provided, and can more accurately determine whether an actuator fails.

Accordingly, the braking apparatus for a vehicle and the method of controlling the same according to embodiments of the present disclosure can improve the stability of a braking system and robustness in failure diagnosis.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A braking apparatus for a vehicle, comprising:
   a master cylinder configured to form a braking pressure based on an input to a brake pedal and transmit the braking pressure to a wheel brake side;
   a motor configured to control the braking pressure transmitted to the wheel brake side by moving a piston included in the master cylinder; and
   a controller configured to control the motor,
   wherein the controller:
   determines whether the piston reaches an end point of travel, based on a rate of change in a position of the piston and a current of the motor; and
   sets a displacement of the piston as a maximum displacement when it is determined that the piston has reached the end point of travel and a position initialization for the piston has not been completed.

2. The braking apparatus of claim 1, wherein the controller outputs a warning signal when it is determined that the piston has reached the end point of travel, and the position initialization for the piston has been completed.

3. The braking apparatus of claim 1, wherein the controller determines that the piston has reached the end point of travel, when the rate of change in the position of the piston is a threshold rate of change or less and the current of the motor is equal to or greater than a reference current by a threshold value.

4. The braking apparatus of claim 1, wherein the controller sets the position initialization for the piston as having been completed when setting the displacement of the piston as the maximum displacement.

5. The braking apparatus of claim 1, wherein the controller performs a backward pressure control process after setting the displacement of the piston as the maximum displacement.

6. The braking apparatus of claim 5, wherein the controller determines whether the piston reaches the end point of travel, in a forward pressure control process.

7. A method of controlling a braking apparatus for a vehicle, which comprises a master cylinder configured to form braking pressure based on an input to a brake pedal and transmit the braking pressure to a wheel brake side and a motor configured to control the pressure transmitted to the wheel brake side by moving a piston included in the master cylinder, the method comprising:
- controlling, by a controller, the motor based on required pressure;
- determining, by the controller, whether the piston reaches an end point of travel, based on a rate of change in a position of the piston and a current of the motor; and
- setting, by the controller, a displacement of the piston as a maximum displacement when it is determined that the piston has reached the end point of travel and a position initialization for the piston has not been completed.

8. The method of claim 7, further comprising outputting, by the controller, a warning signal when it is determined that the piston has reached the end point of travel and the position initialization for the piston has been completed.

9. The method of claim 7, wherein in the determining of whether the piston reaches the end point of travel, the controller determines that the piston has reached the end point of travel, when the rate of change in the position of the piston is equal to or less than a threshold rate of change and the current of the motor is greater than a reference current by a threshold value.

10. The method of claim 7, wherein in the setting of the displacement of the piston as the maximum displacement, the controller sets the position initialization for the piston as having been completed.

11. The method of claim 7, further comprising performing, by the controller, a backward pressure control process after the setting of the displacement of the piston as the maximum displacement.

12. The method of claim 11, wherein in the controlling of the motor based on the required pressure, the controller performs a forward pressure control process.

13. The method of claim 7, further comprising calculating, by the controller, the required pressure for the input to the brake pedal when the input to the brake pedal is
- performed before the controlling of the motor based on the required pressure.

\* \* \* \* \*